US008429143B2

(12) United States Patent  (10) Patent No.: US 8,429,143 B2
Ellison et al.  (45) Date of Patent: Apr. 23, 2013

(54) METHODS AND SYSTEMS FOR IMPROVING HASH TABLE PERFORMANCE

(75) Inventors: Timothy Peter Ellison, Winchester (GB); Nikola Grcevski, Toronto, CA (US); David Kevin Siegwart, Easleigh (GB)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/109,444

(22) Filed: Apr. 25, 2008

(65) Prior Publication Data

US 2009/0271366 A1  Oct. 29, 2009

(51) Int. Cl.
*G06F 7/00* (2006.01)

(52) U.S. Cl.
USPC ............ 707/698; 707/665; 707/668; 707/747

(58) Field of Classification Search ........................ None
See application file for complete search history.

(56) References Cited

U.S. PATENT DOCUMENTS

| 5,897,637 | A   | * | 4/1999  | Guha          | 1/1     |
|-----------|-----|---|---------|---------------|---------|
| 5,924,098 | A   | * | 7/1999  | Kluge         | 1/1     |
| 6,212,525 | B1  | * | 4/2001  | Guha          | 707/747 |
| 6,330,557 | B1  |   | 12/2001 | Chauhan       |         |
| 6,438,555 | B1  | * | 8/2002  | Orton         | 1/1     |
| 6,438,560 | B1  | * | 8/2002  | Loen          | 707/769 |
| 6,449,613 | B1  | * | 9/2002  | Egolf et al.  | 1/1     |
| 6,578,131 | B1  | * | 6/2003  | Larson et al. | 711/216 |
| 6,625,592 | B1  |   | 9/2003  | Dyer et al.   |         |
| 6,625,612 | B1  | * | 9/2003  | Tal et al.    | 1/1     |
| 7,043,494 | B1  | * | 5/2006  | Joshi et al.  | 1/1     |
| 7,110,540 | B2  | * | 9/2006  | Rajagopal et al. | 380/44 |
| 7,287,131 | B1  | * | 10/2007 | Martin et al. | 711/154 |
| 7,827,218 | B1  | * | 11/2010 | Mittal        | 707/899 |
| 2002/0073068 | A1 | * | 6/2002 | Guha          | 707/1   |
| 2002/0083033 | A1 | * | 6/2002 | Abdo et al.   | 707/1   |
| 2003/0023628 | A1 |   | 1/2003 | Girardot et al. |       |
| 2003/0197726 | A1 |   | 10/2003 | Weitzman     |         |
| 2003/0200347 | A1 |   | 10/2003 | Weitzman     |         |
| 2004/0125799 | A1 | * | 7/2004 | Buer          | 370/389 |
| 2004/0167923 | A1 | * | 8/2004 | Carr          | 707/102 |
| 2006/0179071 | A1 | * | 8/2006 | Panigrahy et al. | 707/101 |
| 2007/0234005 | A1 | * | 10/2007 | Erlingsson et al. | 711/216 |
| 2007/0239756 | A1 | * | 10/2007 | Li et al.    | 707/102 |
| 2008/0229056 | A1 | * | 9/2008 | Agarwal et al. | 711/216 |

* cited by examiner

*Primary Examiner* — Mohammad S Rostami
(74) *Attorney, Agent, or Firm* — Toler Law Group, P.C.

(57) ABSTRACT

Methods and systems for generating a hashcode for a hash table are provided to improve the hash table performance. A particular method includes receiving an input of a key; applying a hash function to the key to generate an incoming hashcode of the key; encoding a key type into the incoming hashcode to generate a first hashcode; and storing the first hashcode. A particular method includes encoding the key type into at least one bit of a bucket index portion of the incoming hashcode.

20 Claims, 8 Drawing Sheets

METHODS AND SYSTEMS FOR IMPROVING HASH TABLE PERFORMANCE

TECHNICAL FIELD

Embodiments of the present disclosure generally relate to the field of storage of data using hash tables, and in particular to improving the performance of hash tables.

BACKGROUND

A hash table or a hash map is a data structure that associates a given "key" with a given "value". Hash tables are used for storing and accessing data in computer systems. Efficient storage and fast location of data are important features of a computer system and therefore improving hash table performance is an important consideration. Hash tables are used in many different applications within a computer system.

The primary operation of a hash table is a lookup: given a key (for example, a name), find the corresponding value (for example, a birth date). The hash table works by transforming the key using a hash function into a "hashcode" which is a number that is used as an index in an array to locate the desired location (a "bucket") where the values should be.

To facilitate fast storage and retrieval, hash tables compute hashcodes of the keys. The hashcode is an identifier that is required to be identical for all keys that are considered equal within the data structure; however, some keys that are not equal may also have the same hashcode.

When storing or retrieving keys, known hash table implementations first look for those keys whose hashcodes are equal (a fast check) then test the keys themselves to determine if they are actually equal. The effect of only testing keys whose hashcodes are equal reduces the number of more time-costly key equality checks that must be performed.

Key equality checks are costly because they involve de-referencing object memory references for the keys being compared, which can cause central processing unit cache misses and thereby increased execution time to recover.

Known existing implementations of hash tables are not optimized for particular key types, so they suffer the drawback of having to support all possible key types.

It is an aim of the present disclosure to distinguish between different types of keys and use this knowledge to improve the data structure's overall performance.

SUMMARY

According to a first aspect of an embodiment of the present disclosure there is provided a method that includes receiving an input of a key. The method also includes applying a hash function to the key to generate an incoming hashcode of the key. The method also includes encoding a key type into the incoming hashcode to generate a first hashcode. The method also includes storing the first hashcode at a hash table.

In another embodiment, a method includes receiving an input of a first key. The method also includes applying a hash function to the first key to generate an incoming hashcode of the first key. The method also includes encoding a key type into at least one bit of a bucket index portion of the incoming hashcode to generate a search hashcode. The method also includes determining if the search hashcode matches a stored hashcode of a second key.

According to another aspect of the present disclosure there is provided a computer program product stored on a computer readable storage medium comprising computer readable program instructions executable by a processor to: receive an input of a key; apply a hash function to the key to generate an incoming hashcode of the key; and encode a key type into the incoming hashcode to generate a first hashcode.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the present disclosure. However, it will be understood by those skilled in the art that the present disclosure may be practiced without these specific details. In other instances, well-known methods, procedures, and components have not been described in detail so as not to obscure the present disclosure.

Figure 1:
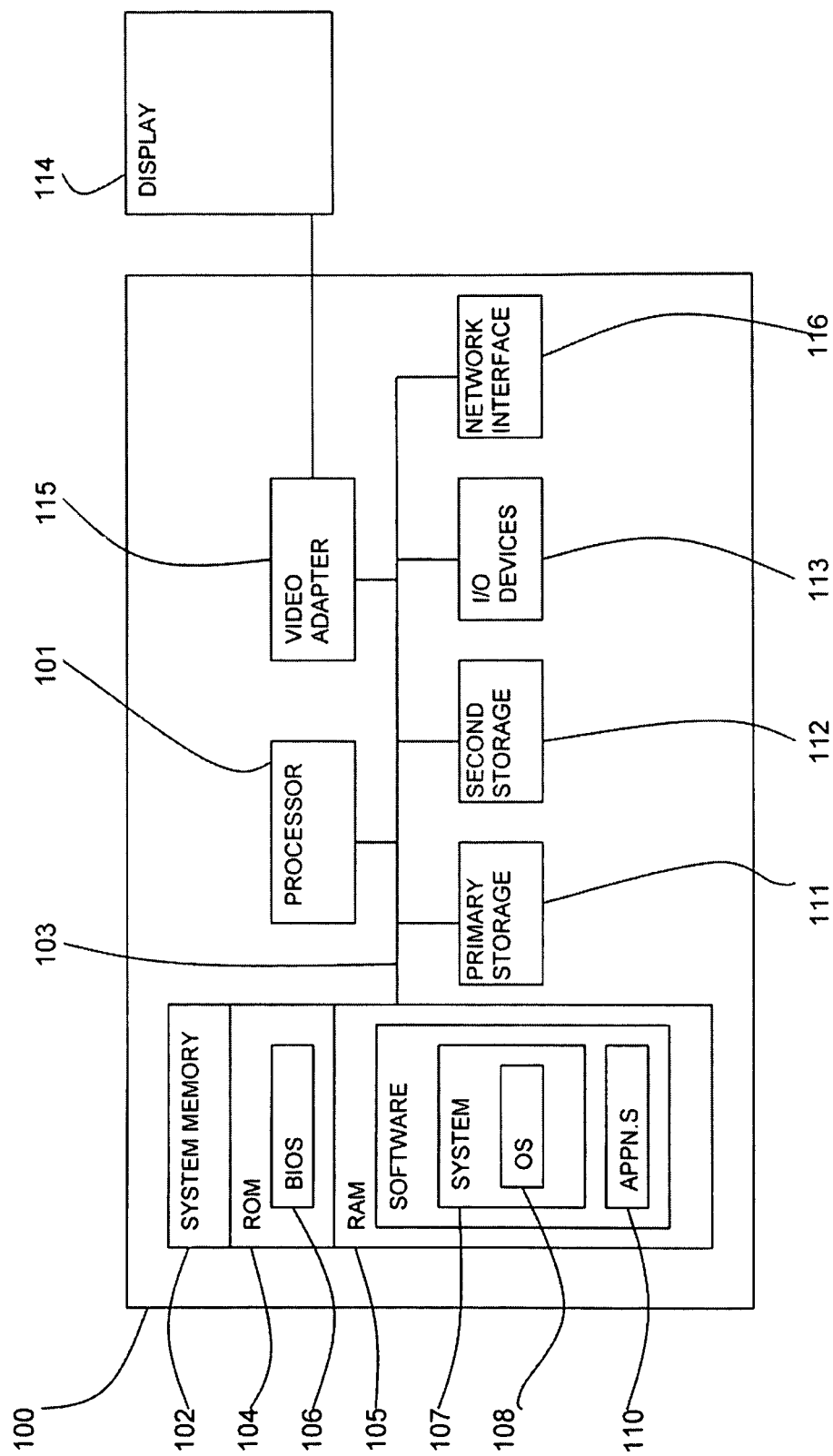
FIG. 1 is a block diagram of an embodiment of a computer system in which the present disclosure may be implemented.

Hash tables are used as data storage structures extensively in computer systems. A computer system employing such data structures is shown in FIG. 1. Referring to FIG. 1, a data processing system 100 suitable for storing and/or executing program code is shown including at least one processor 101 coupled directly or indirectly to memory elements through a bus system 103.

The memory elements can include local memory employed during actual execution of the program code, bulk storage, and cache memories which provide temporary storage of at least some program code in order to reduce the number of times code must be retrieved from bulk storage during execution.

The memory elements may include system memory 102 in the form of read only memory (ROM) 104 and random access memory (RAM) 105. A basic input/output system (BIOS) 106 may be stored in ROM 104. System software 107 may be stored in RAM 105 including operating system software 108. Software applications 110 may also be stored in RAM 105.

The system 100 may also include a primary storage means 111 such as a magnetic hard disk drive and secondary storage means 112 such as a magnetic disc drive and an optical disc drive. The drives and their associated computer-readable media provide non-volatile storage of computer-executable instructions, data structures, program modules and other data for the system 100. Software applications may be stored on the primary and secondary storage means 111, 112 as well as the system memory 102.

The computing system 100 may operate in a networked environment using logical connections to one or more remote computers via a network adapter 116.

Input/output devices 113 can be coupled to the system either directly or through intervening I/O controllers. A user may enter commands and information into the system 100 through input devices such as a keyboard, pointing device, or other input devices (for example, microphone, joy stick, game pad, satellite dish, scanner, or the like). Output devices may include speakers, printers, etc. A display device 114 is also connected to system bus 103 via an interface, such as video adapter 115.

Figure 2:
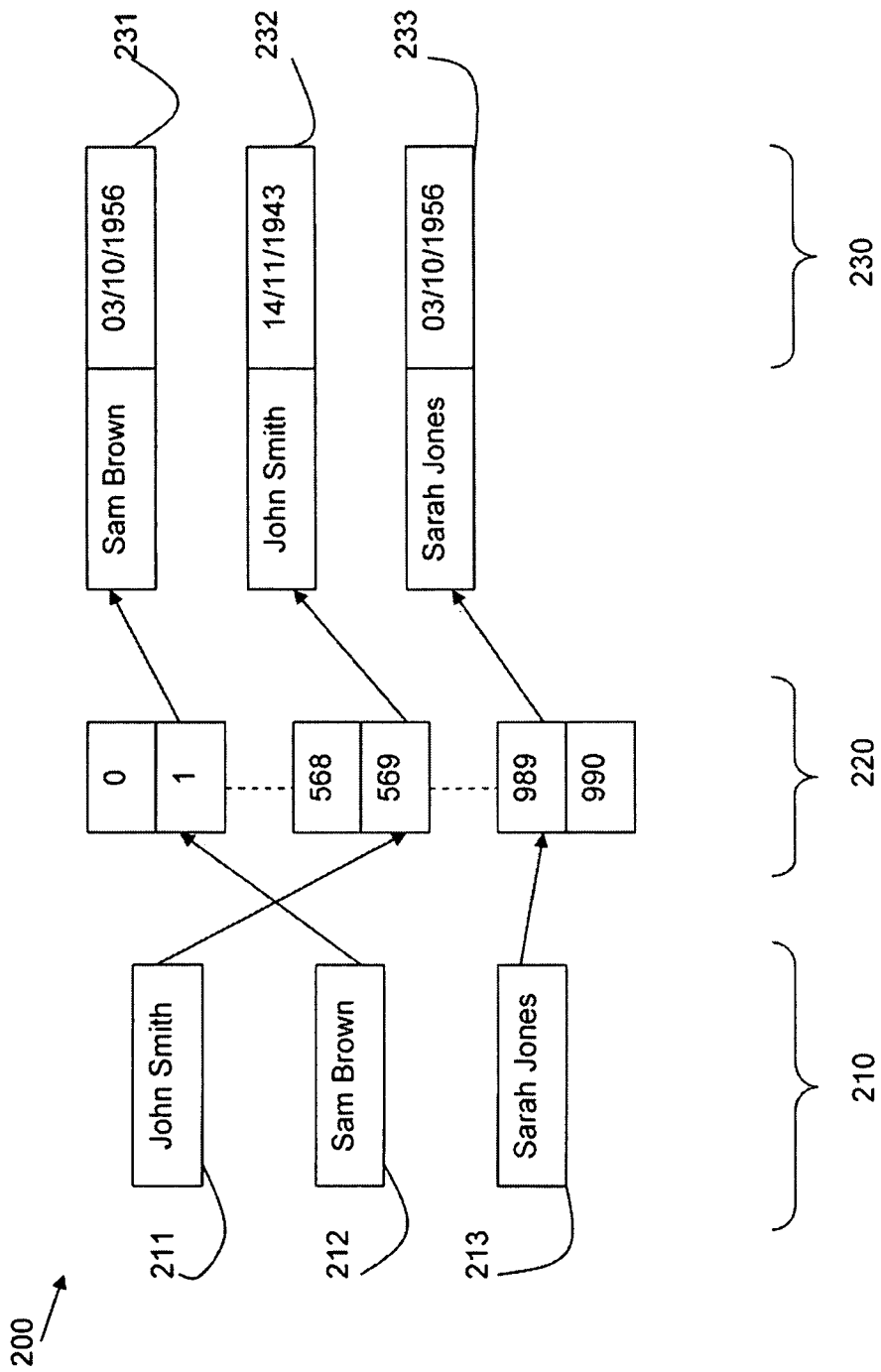
FIG. 2 is a schematic diagram of the operation of a hash table.

Referring to FIG. 2, a schematic diagram is shown of the operation 200 of a hash table or hash map. The hash table includes keys 210 which are transformed by a hash function into hashcodes 220. The hashcodes 220 are used as an index for the location of values 230 for the keys 210. For example, the keys 210 may be names as shown in FIG. 2 such as John Smith 211, Sam Brown 212 and Sarah Jones 213, and the values 230 may be the dates of birth of each key, Sam Brown 03/10/1956 231, John Smith 14/11/1943 232, and Sarah Jones 03/10/1956 233.

Each key 210 is transformed into a hashcode 220. A hashcode 220 indexes a key's value 230. In the example shown, the key of John Smith 211 has a hashcode of 569 which indexes the value 232 of the date of birth of John Smith. Here, the full entry (key and value) is shown with the key in the form of the name present alongside the value in the form of the date of birth.

A hash function is deterministic in that two identical or equivalent inputs must generate the same hash value. If two keys hash to the same index, the corresponding records cannot be stored in the same location. So, if it is already occupied, another location must be found in which to store the new record. There are a number of collision resolution techniques, but one of the most popular is separate chaining using linked lists.

The present disclosure provides an improved implementation of a hash table. In this description, the methods and systems are described in terms of a Java (Java is a trade mark of Sun Microsystems, Inc.) hash table implementation and the detailed description and explanation is expressed using Java syntax and terminology. However, the described methods and systems are applicable to the equivalent implementation in any programming language.

A common representation of a hash table or hash map is as an array of linked lists. For example, the two classes in the Java class library can be considered as such a representation: java.util.HashMap and java.util.Hashtable.

The class of Hashtable implements a hash table, which maps keys to values. Any non-null object can be used as a key or as a value. To successfully store and retrieve objects from a hash table, the objects used as keys implement a hashcode method (which is the hash function) and an equals method.

An instance of Hashtable has two parameters that affect its performance: initial capacity and load factor. The capacity is the number of buckets in the hash table, and the initial capacity is simply the capacity at the time the hash table is created. The hash table uses separate chaining: in the case of a "hash collision", a single bucket stores a linked list, which may contain multiple entries, which must be searched sequentially. The load factor is a measure of how full the hash table is allowed to get before its capacity is automatically increased. When the number of entries in the hash table exceeds the product of the load factor and the current capacity, the capacity is increased by calling a rehash method.

The class of HashMap is a hash table based implementation of a map interlace. This implementation provides all of the optional map operations, and permits null values and the null key. The HashMap class is roughly equivalent to Hashtable, except that it is unsynchronized and permits nulls. This class makes no guarantees as to the order of the map; in particular, it does not guarantee that the order will remain constant over time.

Figure 3:
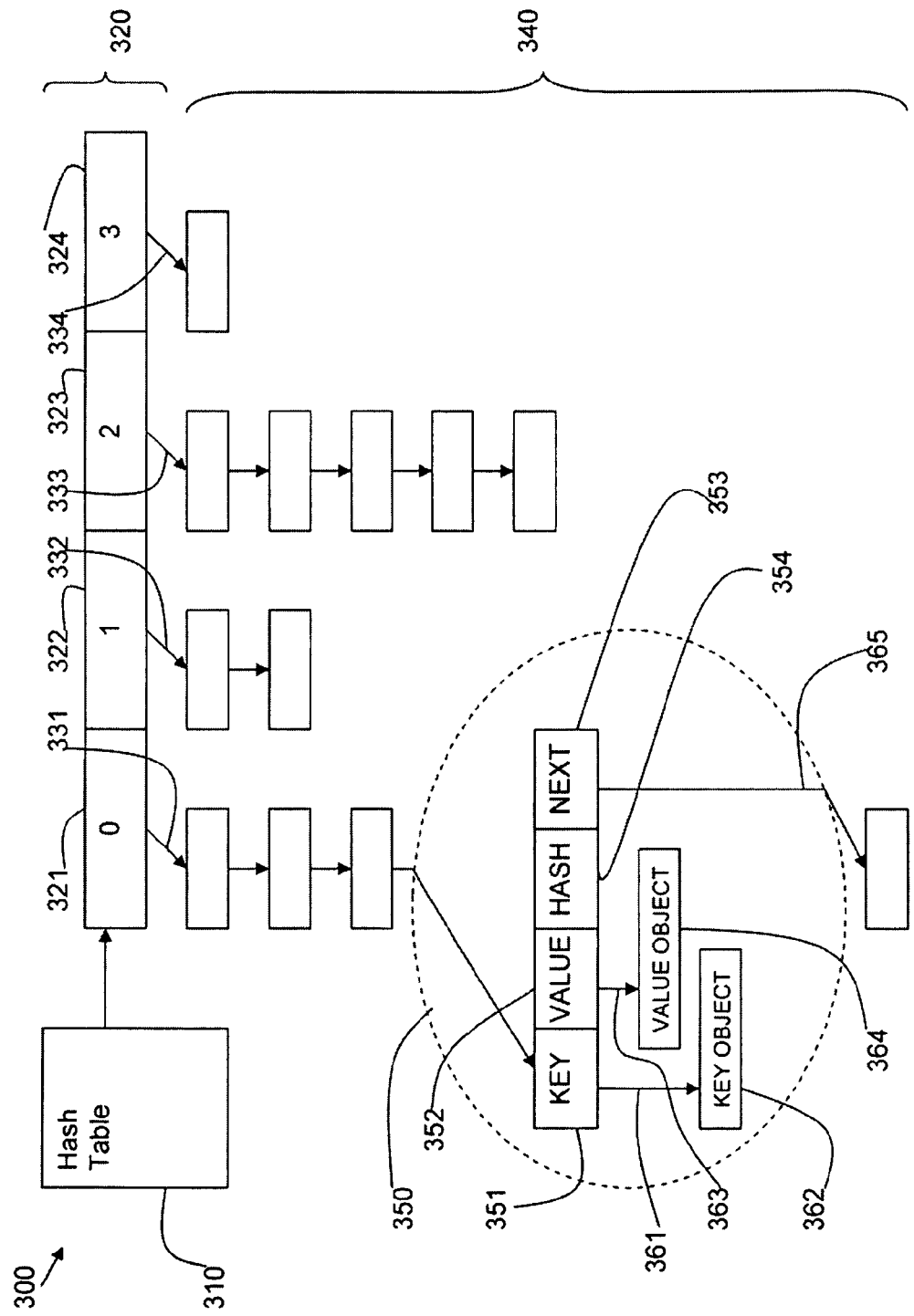
FIG. 3 is a schematic diagram of a hash table.

Referring to FIG. 3, a schematic representation is shown of the components of a data structure 300 with a hash table 310 implemented as an array 320 of linked lists. Each element of the array 320 represents a bucket 321-324 that contains a reference 331-334 to the head of a linked list of map entries 340.

Each entry 340 in the hash table 310 is a structure as shown in the inset 350 of FIG. 3. An entry 340 contains at least three fields: the key 351, the value 352, and the "next" reference 353 for constructing a linked list of entries. As the key comparison can be a complex and computationally intensive operation, the hash table implementation usually adds one extra field inside the entry structure called "hash" 354. The hash 354 is computed at the entry creation based on some properties of the key element in the entry structure. The purpose of the hash 354 is to create a representation of the key 351, such that it can be used for quick test to determine if two keys 351 are not equal. If the hash 354 matches for two keys 351 then a full equality test is preformed.

Each map entry 340 comprises a reference 361 to the key object 362, a reference 363 to the value object 364, the stored hashcode 354 of the key, and a reference 365 to the next map entry in the linked list.

In a described embodiment, the hash table 310 may be in the form of the class library java.util.HashMap. The number of buckets 321-324 is constrained to be a power of 2 to make later computations fast. The minimum length is constrained to be 2 buckets. The hashcode of an object is a 32-bit signed integer value, determined by invoking the hashCode( ) method. The key may be null, in which case the key reference is null and the stored hashcode is zero.

In another embodiment, a hash table may be provided in the form of the class library java.util.Hashtable.

Adding a Map Entry

One desirable property of a hash function is that conversion from the hash value (typically 32 bits) to a bucket index for a particular-size hash table can be done simply by masking, preserving only the lower k bits for a table of size $2^k$.

Figure 4:
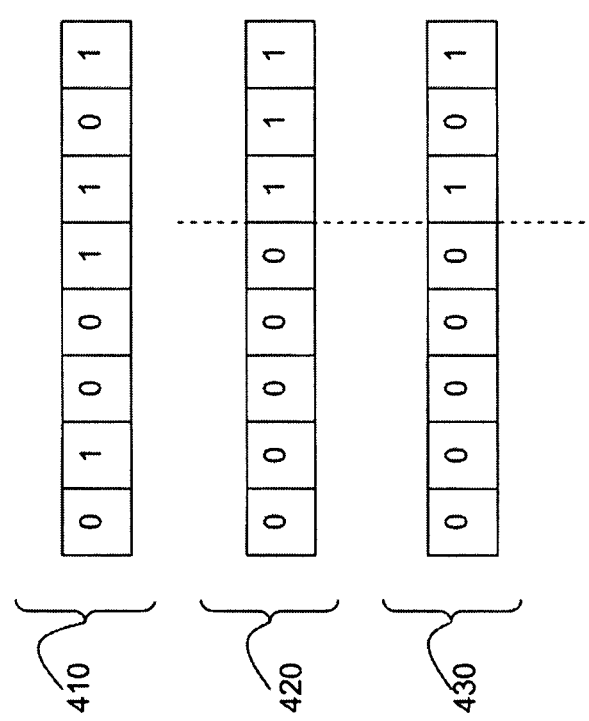
FIG. 4 is a schematic diagram of an incoming hashcode as used in the hash table of FIG. 2.

When adding a new map entry to a hash table containing numBucket buckets, the incoming key's hashcode is first computed. The bucket index is determined by considering the numBucket least significant bits from the key's hashcode.
int index=hash & (numBucket−1);

This is illustrated with reference to FIG. 4. An incoming hashcode 410 is shown in binary form "01001101". If there are 8 buckets in the array, a bucket mask 420 is provided for indexing the 8 buckets in binary form "00000111". The bucket mask 420 has the three least significant bits set to "1", as the three least significant bits "111" is equal to 7 (numBucket minus 1).

When the bucket mask 420 is applied to the incoming hashcode 410 as a bit masking operation, the bucket index 430 is obtained. In this example, the bit masking operation leaves "00000101" which indicates index "101" (bucket number 5) in the array.

The new entry is stored at the head of the bucket, and any existing entry at that position is linked to the next reference of the new entry. The key's hashcode is stored in the entry.

Searching for a Map Entry

When searching for a map entry by key, the incoming key hashcode is computed, the bucket number is determined (as above), then the linked list is searched for the matching key. As an optimization, the equality of the incoming hashcode can be tested with the stored hashcode as a fast integer-to-integer comparison before testing the equality of the incoming key with the stored key, which is an expensive object de-reference, equals( ) message send with the incoming key.

```
while (entry != null &&
        (entry.storedKeyHash != incomingHash ||
        !incomingKey.equals(entry.key))) {
    entry = entry.next;
}
```

Finding Spare Bits in the Stored Hashcode

The set of possible values for an incoming key's hashcode occupies the full range of a 32 bit signed integer. However, within a given bucket the set of possible hashcode values that may be found in the linked list is smaller. This is because for a hash table with numBucket buckets, where numBucket is $2^n$, the algorithm for adding a new map entry guarantees that all entries within a given bucket have identical bit values in the lowest n bit positions.

This information can be used to 'steal' up to n bits from the stored hashcode value to represent optimization information, knowing that the actual hashcode can be reconstructed from the stored hashcode.

Furthermore, this technique does not lose any information contained in the original hashcode.

Figure 5:
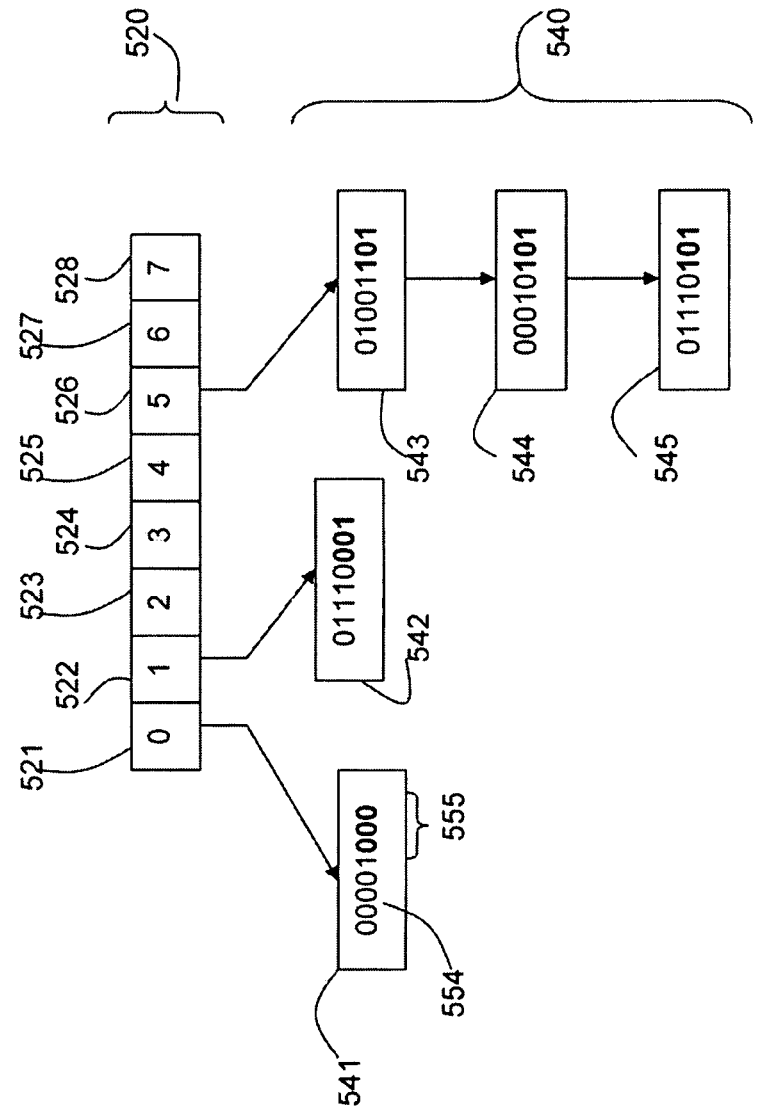
FIG. 5 is a schematic diagram of hashcodes as used in the hash table of FIG. 2.

This is shown with reference to FIG. 5 in which numBucket is $2^3$ with an array 520 with eight buckets 521-528. The last three bits 555 of the hashcodes 554 of entries 540 indicate the bucket 521-528 in which the entry 540 is stored.

In the example shown in FIG. 5, there are the following entries 540: an entry 541 "00001000" in bucket 0 ("000") 521; an entry 542 "01110001" in bucket 1 ("001") 522; and three entries 543-545 "01001101", "00010101", and "01110101" in bucket 5 ("101") 526.

The entries exemplify that all entries within a given bucket have identical bit values in the lowest bit positions. For instance, the entries 543-545 for bucket 5 ("101") all have the same last three bits ("101"), which is the same as the bucket index.

Knowing that bit values are the same as the bucket index, the bits indicating the bucket index can be re-purposed for storing other information in the knowledge that the original bit values can be reconstructed from the bucket index when necessary.

Optimizing for a Known Key Type

Using the spare bits in the stored hashcode, searching can be optimized for some known key types. The optimization avoids de-referencing the key object reference and invoking the equals method for each searched entry with an equal incoming and stored hashcode.

This is the original search shown earlier but with the expensive de-reference indicated:

```
while (entry != null &&
        (entry.storedKeyHash != incomingHash ||
        !incomingKey.equals(entry.key))) { <<--- Avoid this test
    entry = entry.next;
}
```

Types that are suitable for optimization are those whose computed hashcode value and equality art defined, for example, by the Java Language Specification, and for which the equality criteria can be encoded in the hashcode. Examples include, Boolean, Byte, Character, Short, Integer, Float, etc.

Within a given bucket, the value of the n bits of a stored hashcode can be used to determine the type of the key, and the remaining bits of the stored hashcode are unique to the equality proposition of the key instance.

Optimizing for the Integer Key Type

As an example embodiment, the Integer key type is used. If the numBucket is constrained to be $\geq 2$ then there is at least one spare bit to encode the integer key type in the stored hashcode.

The algorithms for adding a map entry, and searching for a map entry are modified as follows. When adding a new entry, the incoming key's hashcode is first computed. The bucket is determined by considering the n least significant bits from the key's hashcode as before.

If the incoming key is an Integer, the stored hashcode is computed as (key.hashcode( )|0×1), i.e. the least significant bit is set. If the incoming key is not an Integer, the stored hashcode is computed as (key.hashcode( ) & 0×FFFFFFFE), i.e. the least significant bit is cleared.

```
int index = incomingKeyHash & (numBucket – 1);
if (incomingKey instanceof Integer) {
    entry.storedKeyHash = incomingKeyHash | 0x00000001;
} else {
    entry.storedKeyHash = incomingKeyHash & 0xFFFFFFFE;
}
```

This is illustrated with reference to FIG. 6 in which numBucket is $2^3$ with an array 620 with eight buckets 621-628. The last three bits 655 of the hashcodes 654 of entries 640 originally (as shown in FIG. 5) indicated the bucket 621-628 in which the entry 640 is stored. However, now the least significant bit 656 of the hashcodes 654 is used to indicate the key type. In this example, the key type is whether the key is an Integer or not.

Figure 6:
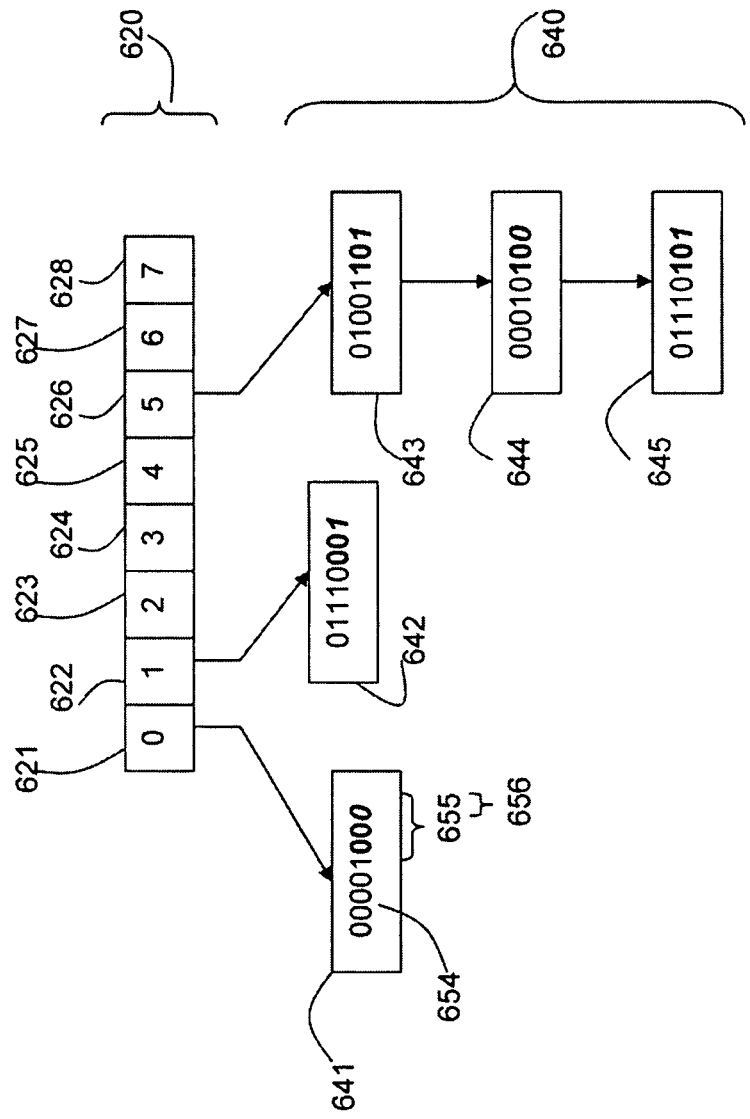
FIG. 6 is a schematic diagram of hashcodes in accordance with the present disclosure.

In the example shown in FIG. 6, there are the following entries 640: an entry 641 "00001000" in bucket 0 ("000") 621 (this entry 641 has the last bit set to "0" to show it is a non-Integer key); an entry 642 "01110001" in bucket 1 ("001") 622 (this entry has the last bit set to "1" to show it is an Integer key); and three entries 643-645 "01001101", "00010100", and "01110101" in bucket 5 ("101") 626. Each of these entries has the last bit set to "1" or "0" to indicate respectively if it is an Integer key or non-Integer key.

Figure 7:
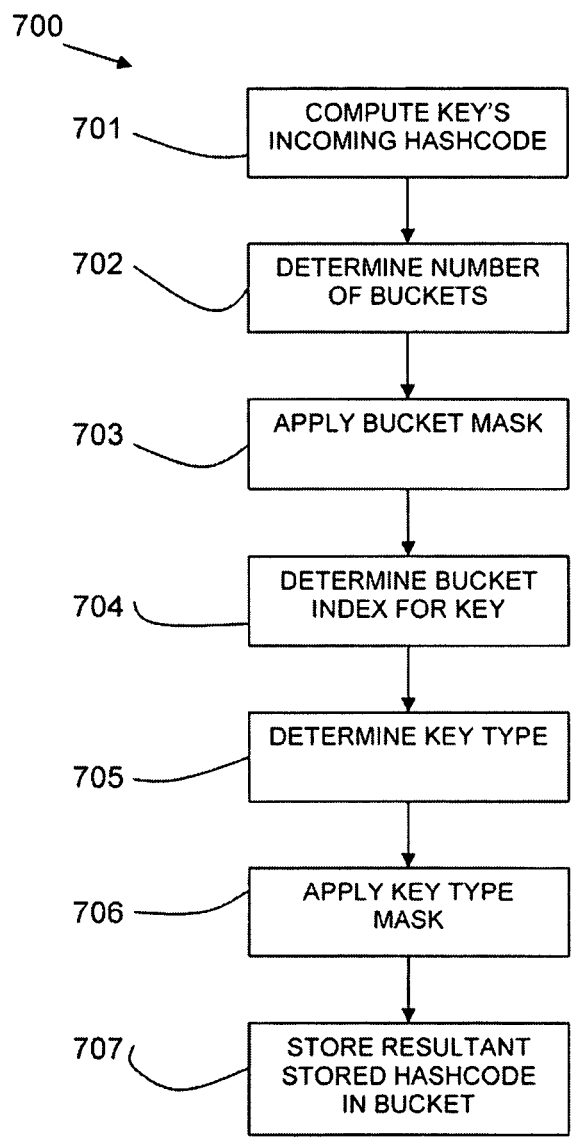
FIG. 7 is a flow diagram of a method of adding an entry in accordance with the present disclosure.

A method of adding a key entry with key type information is shown in the flow diagram 700 of FIG. 7. A key's incoming hashcode is computed 701. If the number of buckets is determined 702 as $2^n$, a bucket mask for the n least significant bits is applied 703 to determine 704 the bucket index in which the key is to be stored. The key type is then determined 705, and the key type mask is applied 706 to up to the n least significant bits of the incoming hashcode. The result is a stored hashcode which is stored 707 in the bucket. For example, if the key type is whether the key is an Integer or non-Integer, an Integer type mask is respectively applied to set or clear the least significant bit.

The search algorithm now becomes:

```
if (incomingKey instanceof Integer) {
    int searchKeyHash = incomingKey.hashCode( ) | 0x00000001;
    while (entry != null && (entry.storedKeyHash != searchKeyHash)) {
        entry = entry.next;
    }
} else {
    int searchKeyHash = incomingKey.hashCode( ) & 0xFFFFFFFE;
    while (entry != null &&
        (entry.storedKeyHash != searchKeyHash ||
        !incomingKey.equals(entry.key))) {
        entry = entry.next;
    }
}
```

The search is divided into two parts, depending on whether the incoming key is an Integer or not. If the key is not an Integer, then the original algorithm is used, which uses the costly equals method. If the key is an Integer, then only the hashcodes are compared.

A first important remark is now made: an integer to integer comparison (entry.storedKeyHash!=searchKeyHash) carries out two comparisons at once. It compares the key types in a bit to bit comparison of the least significant bit. This determines whether the two keys are both Integers. It also compares the most significant bits of the original hash functions of the two keys up to the least significant bit. If this part of the hashcode is equal, then the hash functions are equal, because it is already known that the least significant bit is equal; the hash functions generated the same bucket index.

A second important remark is now made: the hashcode function and the integer value of an Integer are identical; if two hashcodes of two Integers are equal, then the two Integers are equal. Thus the full test for equality is not required for Integers as it is for most other key types.

These two remarks imply that three tests for equality: equal hashcodes, equal types and equals method can be replaced by a single integer to integer comparison between the stored hashcode and the search hashcode. This removes the expensive equality check identified above for the case of an Integer key.

Figure 8:
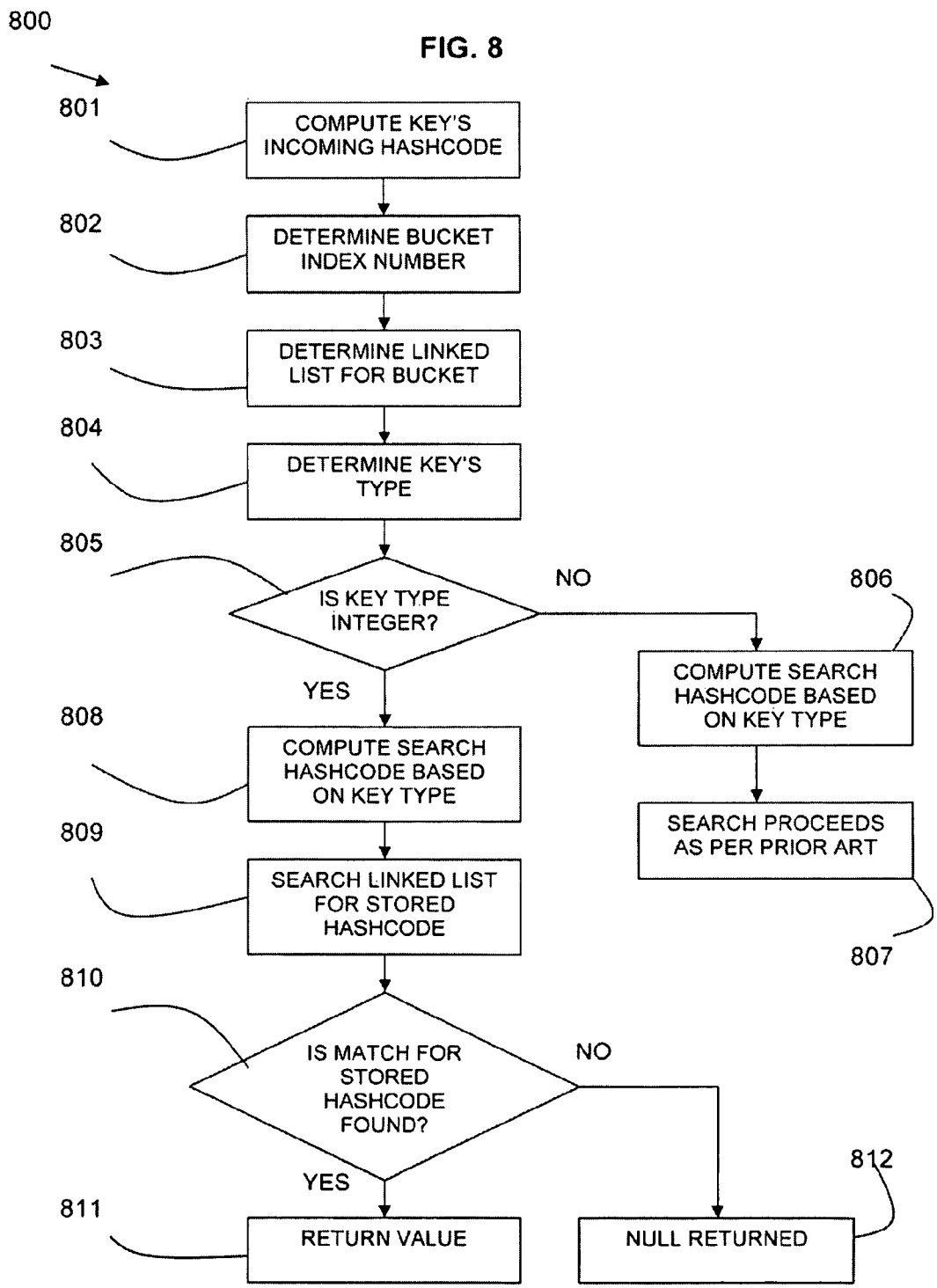
FIG. 8 is a flow diagram of a method for searching for an entry in accordance with the present disclosure.

Referring to FIG. 8, a flow diagram 800 shows a method of searching for a map entry by key as described above. The key's incoming hashcode is computed 801, and the bucket number is determined 802. The linked list for the bucket is determined 803. The key type is determined 804. It is determined 805 if the key type is that of an Integer. If not, then the search hashcode is computed 806 for the incoming key based on its type (as above). Then the search proceeds 807 as per prior art as in Section "Searching for a map entry".

If in 805 the key type is an Integer, then the search hashcode is computed 808 for the incoming key based on its type (as above). Then the linked list is searched 809 for the matching stored hashcode. It is determined 810 if an identical stored hashcode is found. If so, the method has found a key that is equal in type and value, and the value is returned 811 directly. If not, then the method did not find a matching key, the key object is not contained in the hash table and null is returned 812.

Rehashing the Hash Table

The stored hashcodes are not returned to the caller through regular application programming interface calls. However, it is necessary to do the inverse operation when rehashing the hash table, since the stored hashes are only unique within the bucket, and during rehashing the entries may change buckets.

When rehashing from $2^n$ buckets to $2^m$ buckets, the stored hashcode is first restored to the original incoming hashcode value by setting the lowest n bits back to the value of the bucket index it is leaving, then computing the new stored hashcode using the lowest m bits as described above.

For example, when using a single bit, each entry in the bucket oldIndex is rehashed to newIndex using

```
int actualHash = (oldIndex & 0x00000001) | (entry.storedKeyHash & 0xFFFFFFFE);
int newIndex = actualHash & (numBucket – 1);
```

Alternative Embodiments and Concluding Remarks

The described methods enhance the implementation of a hash table to optimize the data locality for known uses of the data structure.

As will be understood by those skilled in the art, alternative embodiments may be provided using different key types.

In the case where the number of buckets is ≧4 there are at least two spare bits such that two least significant bits ate available for reuse in the stored hashcode, allowing four values to be encoded.

In this case, three distinct key types may be encoded in the stored hashcode, with the fourth encoding being used to identify all remaining key types. As an example alternative embodiment, Integer, Float and Short could be arranged to be the three such key types that are encoded and thus optimized. As before, the optimization depends on the relationship that objects of the encoded types are equal if their hashcodes are equal, so this relationship must be maintained for the implementations of Integer, Float and Short. For Integer and Float, this is implied in the Java Language Specification.

Some differing keys may generate the same incoming hashcode. When searching a hash table for entries matching a given incoming hashcode, matching entries are identified, then each entry is analyzed for full equality to the key. Full equality testing is resource-costly. The described method reduces the number of occasions full equality testing is required.

The example embodiments use the least significant bits to indicate the bucket index and to use these least significant bits to encode the key type. The bucket index may be determined by other selected bits in the incoming hashcode. For example, the most significant bits may be used for encoding the key type.

Embodiments of the present disclosure can take the form of an entirely hardware embodiment, an entirely software embodiment, or an embodiment containing both hardware and software elements. In a preferred embodiment, the present disclosure is implemented in software, which includes but is not limited to firmware, resident software, microcode, etc.

Embodiments of the present disclosure can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing, without departing from the scope of the present disclosure.

What is claimed is:

1. A method, comprising:
   receiving an input of a key;
   applying a hash function to the key to generate an incoming hashcode of the key for a hash table;
   generating the incoming hashcode based on the hash function;
   determining a number of buckets in the hash table;
   applying a bucket mask based on the determined number of buckets to at least one bit of a bucket index portion of the incoming hashcode;
   determining a bucket index of the incoming hashcode based on the applied bucket mask;
   determining a data type of the key, wherein the data type of the key comprises at least one of boolean, byte, character, short, integer, or float;
   applying a data type mask based on the determined data type to the incoming hashcode by modifying at least one bit of the bucket index portion of the incoming hashcode to encode the determined data type of the key into the bucket index portion of the incoming hashcode to generate a modified incoming hashcode, wherein the bucket index portion of the incoming hashcode corresponds to at least one bit of least significant bits of the incoming hashcode, and wherein modifying the bucket index portion of the incoming hashcode to encode the determined data type of the key includes modifying at least one bit of the least significant bits of the incoming hashcode;
   generating the modified incoming hashcode based on the applied data type mask; and
   storing the modified incoming hashcode in a bucket of the hash table corresponding to the determined bucket index.

2. The method of claim 1, wherein the number of buckets in the hash table is 2n, wherein n is an integer greater than or equal to one.

3. The method of claim 1, further comprising reversing the encoding of the data type of the key in the modified incoming hashcode to re-generate the incoming hashcode of the key.

4. A method, comprising:
   receiving an input of a first key;
   applying a hash function to the first key to generate an incoming hashcode of the first key for a
   hash table;
   generating the incoming hashcode based on the hash function;
   determining a number of buckets in the hash table;
   applying a bucket mask based on the determined number of buckets to at least one bit of a bucket index portion of the incoming hashcode;
   determining a bucket index of the incoming hashcode based on the applied bucket mask;
   determining a data type of the first key, wherein the data type of the first key comprises at least one of boolean, byte, character, short, integer, or float;
   applying a data type mask based on the determined data type to the incoming hashcode by modifying at least one bit of the bucket index portion of the incoming hashcode to encode the determined data type of the first key into the bucket index portion of the incoming hashcode to generate a modified incoming hashcode, wherein the bucket index portion of the incoming hashcode corresponds to at least one bit of least significant bits of the incoming hashcode, and wherein modifying the bucket index portion of the incoming hashcode to encode the determined data type of the key includes modifying at least one bit of the least significant bits of the incoming hashcode;
   generating the modified incoming hashcode based on the applied data type mask; and
   determining if the modified incoming hashcode of the first key matches a stored hashcode of a second key.

5. The method of claim 4, wherein determining if the modified incoming hashcode matches the stored hashcode comprises carrying out an integer to integer comparison.

6. The method of claim 4, further comprising rehashing the hash table, wherein rehashing the hash table comprises:
   reversing the encoding of the data type of the first key in the modified incoming hashcode to re-generate the incoming hashcode;
   re-encoding the determined data type of the first key to generate a second modified hashcode; and
   storing the second modified hashcode at the hash table.

7. The method of claim 6, wherein rehashing the hash table comprises changing bucket indexes of keys, and wherein reversing the encoding of the data type of the first key is used to determine a changed bucket index.

8. A computer program product stored on a computer readable storage device comprising computer readable program instructions, the instructions executable by a processor to:
   receive an input of a key;
   apply a hash function to the key to generate an incoming hashcode of the key for a hash table;
   generate the incoming hashcode based on the hash function;
   determine a number of buckets in the hash table;
   apply a bucket mask based on the determined number of buckets to at least one bit of a bucket index portion of the incoming hashcode;
   determine a bucket index of the incoming hashcode based on the applied bucket mask;
   determine a data type of the key, wherein the data type of the key comprises at least one of boolean, byte, character, short, integer, or float;
   apply a data type mask based on the determined data type to the incoming hashcode by modifying at least one bit of the bucket index portion of the incoming hashcode to encode the determined data type of the key into the bucket index portion of the incoming hashcode to generate a modified incoming hashcode, wherein the bucket index portion of the incoming hashcode corresponds to at least one bit of most significant bits of the incoming hashcode, and wherein modifying the bucket index portion of the incoming hashcode to encode the determined data type of the key includes modifying at least one bit of the most significant bits of the incoming hashcode;
   generate the modified incoming hashcode based on the applied data type mask; and
   store the modified incoming hashcode in a bucket of the hash table corresponding to the determined bucket index.

9. The computer program product of claim 8, wherein the number of buckets in the hash table is 2n, and wherein n is an integer greater than or equal to one.

10. The computer program product of claim 8, further comprising instructions to reverse the encoding of the data type of the key in the modified incoming hashcode to re-generate the incoming hashcode of the key.

11. The computer program product of claim 9, further comprising instructions to determine when the modified incoming hashcode matches a stored hashcode stored at the hash table.

12. The computer program product of claim 11, wherein determining when the modified incoming hashcode matches the stored hashcode comprises carrying out an integer to integer comparison.

13. The method of claim 5, wherein the integer to integer comparison includes comparing a least significant bit of the modified incoming hashcode of the first key and a least significant bit of the stored hashcode of the second key for a match, wherein comparing the least significant bits compares data types encoded into the modified incoming hashcode and the stored hashcode.

14. The method of claim 6, further comprising:
re-generating the incoming hashcode based on the hash function;
applying the bucket mask based on the determined number of buckets to at least one bit of a bucket index portion of the re-generated incoming hashcode, wherein the bucket index portion of the re-generated incoming hashcode is different from than the bucket index portion of the incoming hashcode; and
determining a changed bucket index of the re-generated incoming hashcode based on the applied bucket mask, wherein the determined changed bucket index of the re-generated incoming hashcode is different than the determined bucket index of the incoming hashcode.

15. The method of claim 14, further comprising:
re-encoding the determined data type of the first key to generate the second hashcode by applying the data type mask based on the determined data type to the re-generated incoming hashcode by modifying at least one bit of the bucket index portion of the re-generated incoming hashcode to encode the determined data type of the first key into the bucket index portion of the re-generated incoming hashcode to generate the second hashcode;
generating the second hashcode based on the applied data type mask; and
storing the second hashcode at the hash table by storing the second hashcode in a bucket of the hash table corresponding to the determined changed bucket index.

16. The method of claim 4, wherein the number of buckets in the hash table is 2n, wherein n is an integer greater than or equal to one.

17. The method of claim 13, wherein the integer to integer comparison further includes comparing most significant bits up to the least significant bit of the modified incoming hashcode of the first key and most significant bits up to the least significant bit of the stored hashcode of the second key for a match responsive to whether there is a match of the least significant bit of the modified incoming hashcode of the first key and the least significant bit of the stored hashcode of the second key.

18. The computer program product of claim 10, further comprising instructions to:
re-encode the determined data type of the key to generate a second modified hashcode; and
store the second modified hashcode at the hash table.

19. The computer program product of claim 18, further comprising instruction to:
re-generate the incoming hashcode based on the hash function;
apply the bucket mask based on the determined number of buckets to at least one bit of a bucket index portion of the re-generated incoming hashcode, wherein the bucket index portion of the re-generated incoming hashcode is different than the bucket index portion of the incoming hashcode; and
determine a changed bucket index of the re-generated incoming hashcode based on the applied bucket mask, wherein the determined changed bucket index of the re-generated incoming hashcode is different than the determined bucket index of the incoming hashcode.

20. The computer program product of claim 19, further comprising instruction to:
re-encode the determined data type of the key to generate the second hashcode by applying the data type mask based on the determined data type to the re-generated incoming hashcode by modifying at least one bit of the bucket index portion of the re-generated incoming hashcode to encode the determined data type of the key into the bucket index portion of the re-generated incoming hashcode to generate the second hashcode;
generate the second hashcode based on the applied data type mask; and
store the second hashcode at the hash table by storing the second hashcode in a bucket of the hash table corresponding to the determined changed bucket index.

* * * * *